US012188430B2

(12) United States Patent
Wildhagen et al.

(10) Patent No.: US 12,188,430 B2
(45) Date of Patent: Jan. 7, 2025

(54) CRANKCASE FOR AN INTERNAL COMBUSTION ENGINE, AND INTERNAL COMBUSTION ENGINE

(71) Applicant: Rolls-Royce Solutions GmbH, Friedrichshafen (DE)

(72) Inventors: Jörn Wildhagen, Ravensburg (DE); Artur Hunger, Oberteuringen (DE); Martin Gebhardt, Markdorf (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 0 days.

(21) Appl. No.: 17/640,528

(22) PCT Filed: Sep. 4, 2020

(86) PCT No.: PCT/EP2020/074794
§ 371 (c)(1),
(2) Date: Apr. 12, 2022

(87) PCT Pub. No.: WO2021/044000
PCT Pub. Date: Mar. 11, 2021

(65) Prior Publication Data

US 2022/0316418 A1 Oct. 6, 2022

(30) Foreign Application Priority Data

Sep. 5, 2019 (DE) ..................... 10 2019 123 878.1

(51) Int. Cl.
*F02F 1/14* (2006.01)
*F01P 3/02* (2006.01)
(Continued)

(52) U.S. Cl.
CPC *F02F 1/14* (2013.01); *F01P 3/02* (2013.01); *F02F 1/242* (2013.01); *F02F 1/40* (2013.01)

(58) Field of Classification Search
CPC ...... F02F 1/14; F02F 1/40; F02F 1/242; F02F 1/004; F01P 3/02; F01P 3/16; F01P 2003/028
See application file for complete search history.

(56) References Cited

U.S. PATENT DOCUMENTS 4,046,114 A * 9/1977 Hamparian ........... F02F 1/4214
60/272
5,176,113 A 1/1993 Hama et al.
(Continued)

FOREIGN PATENT DOCUMENTS

AT 005 939 U1 1/2003
CN 103953453 A 7/2014
(Continued)

OTHER PUBLICATIONS

International Search Report and Written Opinion dated Nov. 24, 2020 for International Application No. PCT/EP2020/074794 (12 pages).

*Primary Examiner* — Grant Moubry
(74) *Attorney, Agent, or Firm* — Taylor IP, P.C.

(57) ABSTRACT

A crankcase includes: at least one cylinder for an internal combustion engine, the cylinder including: a cylinder interior; a cylinder liner which is arranged within the cylinder interior; a cylinder head which closes the cylinder interior, wherein the cylinder head includes a receiving way; a cooling system which guides a coolant flow and has a cooling chamber; a distribution system to separate the coolant flow into a primary partial flow and at least one secondary partial flow, the distribution system including a main channel for the primary partial flow and at least one branch-off passage for the at least one secondary partial flow, the at least one branch-off passage branching off from
(Continued)

the main channel and being arranged transversely to the main channel for the at least one secondary partial flow.

12 Claims, 4 Drawing Sheets

(51) Int. Cl.

| | |
|---|---|
| ***F02F 1/24*** | (2006.01) |
| ***F02F 1/40*** | (2006.01) |

(56) References Cited

U.S. PATENT DOCUMENTS

| | | | | |
|---|---|---|---|---|
| 5,207,189 | A | 5/1993 | Kawauchi et al. | |
| 5,211,137 | A | 5/1993 | Kawauchi et al. | |
| 9,797,293 | B2 | 10/2017 | Maki et al. | |
| 2010/0132639 | A1 | 6/2010 | Pöschl et al. | |
| 2012/0291726 | A1 | 11/2012 | Galeazzi et al. | |
| 2015/0211408 | A1* | 7/2015 | Maier | F02F 1/38<br>123/41.82 R |
| 2016/0298522 | A1 | 10/2016 | Ekman et al. | |
| 2018/0347443 | A1 | 12/2018 | Boehmer et al. | |

FOREIGN PATENT DOCUMENTS

| | | | |
|---|---|---|---|
| CN | 106988851 | A | 7/2017 |
| DE | 32 26 880 | A1 | 1/1984 |
| DE | 10 2005 031 243 | B4 | 3/2017 |
| SU | 699219 | | 11/1979 |
| SU | 1456620 | A1 | 2/1989 |
| WO | 2016/027012 | A1 | 2/2016 |

* cited by examiner

CRANKCASE FOR AN INTERNAL COMBUSTION ENGINE, AND INTERNAL COMBUSTION ENGINE

CROSS REFERENCE TO RELATED APPLICATIONS

This is a nationalization, under 35 U.S.C. § 371, of PCT application no. PCT/EP2020/074794, entitled "CRANKCASE FOR AN INTERNAL COMBUSTION ENGINE, AND INTERNAL COMBUSTION ENGINE," filed Sep. 4, 2020, which is incorporated herein by reference. PCT application no. PCT/EP2020/074794 claims priority to German patent application DE 10 2019 123 878.1, filed Sep. 5, 2019, which is incorporated herein by reference.

BACKGROUND OF THE INVENTION

1. Field of the Invention

The present invention relates to a crankcase having a number of at least one cylinder, for an internal combustion engine, wherein the cylinder further includes: a cylinder lining which is arranged within a cylinder interior, and a cylinder head which closes the cylinder interior, wherein the cylinder head has a receiving way and a cooling system which guides a coolant flow and includes a cooling chamber. The invention also relates to an internal combustion engine. A receiving way may be designed, in particular, as a receiving way including and/or guiding a receiving sleeve or a receiving bushing or the like for a device or component which extends into the cylinder, in particular for an injector or an ignition device.

2. Description of the Related Art

Crankcases for internal combustion engines, especially those with cooling systems, are well known.

AT005939U1 describes a cylinder head for a liquid-cooled internal combustion engine, with a cooling chamber arrangement adjoining a fire deck, which is subdivided by an intermediate deck formed substantially parallel to the fire deck into a lower partial cooling chamber on the fire deck side and an upper partial cooling chamber adjoining the latter in the direction of the cylinder axis, the lower and upper partial cooling chambers are fluidically connected by at least one overflow opening.

However, these approaches still need to be improved, especially with regard to efficient cooling. This efficiency refers in particular to a relatively high cooling capacity with relatively little equipment expenditure. The equipment expenditure refers in particular to weight, installation space and/or the costs of the cooling device.

What is needed in the art is to rectify at least one of the aforementioned disadvantages and to enable efficient cooling of a cylinder arranged in a crankcase.

SUMMARY OF THE INVENTION

The present invention is based on a crankcase having a number of at least one cylinder, for an internal combustion engine, wherein the cylinder further includes: a cylinder liner which is arranged within a cylinder interior, and a cylinder head which closes the cylinder interior, wherein the cylinder head has a receiving way, in particular a receiving way including/and or guiding a receiving sleeve or a receiving bushing or the like for a device or component which extends into the cylinder, in particular for an injector or an ignition device, and a cooling system which guides a coolant flow and has a cooling chamber.

According to the present invention,

- a distribution system is provided in the crankcase to separate the coolant flow into a primary partial flow and at least one secondary partial flow, wherein
- the crankcase is equipped with a main channel for the primary partial flow and with a branching passage, which branches off from the main channel and is arranged transversely to the main channel for the secondary partial flow.

In the present case, a "branch passage branching off transversely to the main channel" means in particular an arrangement of the at least one branch passage that substantially changes the flow direction of the coolant flow relative to the orientation of the main channel, in particular a perpendicular arrangement of the at least one branch passage relative to the orientation of the main channel. An ignition device may in particular be designed as a spark plug.

The present invention is based on the finding that more efficient cooling of a cylinder in a crankcase represents a significant improvement of an internal combustion engine.

According to the invention, an even higher cooling capacity can be achieved with an existing coolant flow if on the one hand the latter is applied to the cylinder according to cooling requirements and on the other hand, is allocated in a suitable manner. The invention has herein recognized that certain regions of the cylinder are exposed to particularly high heat development and thus have an increased cooling requirement compared to other regions.

Such regions with increased cooling requirements include in particular the flame deck of the cylinder head and the so-called top liner region, in other words the upper region of the cylinder liner facing the cylinder head.

The cooling efficiency is increased by dividing the coolant flow according to cooling requirements. For this purpose, the crankcase has a distribution system for separating the coolant flow into a primary partial flow and at least one secondary partial flow. In this way, different cooling circuits can be formed with different coolant volumes, each adapted to an individual cooling requirement; in particular coolant mass flows can be formed.

The distribution system is designed to guide the primary partial flow in a main channel and to divert the at least one secondary partial flow via a branch-off passage arranged transversely to the main channel and branching off from the main channel, in particular to supply the secondary partial flow to a cooling zone of the cylinder liner for the purpose of cooling. The distribution system can be incorporated into the crankcase as a system of bores and channels.

In particular, one or more individual regions of the cylinder liner can be supplied separately by the at least one secondary partial flow via correspondingly one or more cooling zones.

Overall, the improved cooling can lead to several advantages. Firstly, this relates to the possibility of performing the combustion within the cylinder with increased energy conversion on the basis of higher cooling capacity, resulting in an increase in performance while maintaining the same installation space. Alternatively or additionally, due to the improved cooling performance, a lighter and/or more cost-effective material can be advantageously used for the production of the cylinder head, resulting in weight and/or cost advantages in the production of the engine. Overall, the inhomogeneous deformation of the cylinder and in particular the cylinder liner is reduced due to the improved cooling and the thermally induced distortion, whereby the interaction between the cylinder liner and the parts moving within the cylinder liner, in particular pistons and piston rings, is improved.

The invention also provides an internal combustion engine, wherein the engine has a crankcase according to the present invention. The advantages of the crankcase are used advantageously with the internal combustion engine.

Within the scope of further development, it is provided that the distribution system supplies the at least one secondary partial flow to a top-liner region of the cylinder liner that is located closer to the cylinder head and the primary partial flow to a residual region of the cylinder liner located further removed from the cylinder head. Since, as expected, higher temperatures occur in particular in the top-liner region than in the rest of the region of the cylinder liner, dividing the coolant flow and targeting the supply of regions which are mechanically and/or thermally more stressed, in particular the top-liner region, is particularly advantageous. The distribution system can be designed and/or adjusted as needed, in such a way that a sufficient amount of coolant is supplied to the top-liner region via the at least one secondary partial flow, in particular in comparison to the remaining region of the cylinder liner. The cooling system optionally has a supply passage for feeding the coolant flow along the receiving way—in particular a receiving way including and/or guiding a receiving sleeve or receiving bushing or the like for a device or component extending into the cylinder, in particular for an injector or an ignition device—onto a flame deck of the cylinder head in such a way that an impingement flow occurs on the flame deck. This further development optionally includes an essentially parallel flow alignment of the coolant flow along the flame deck, in particular more concretely a change in the flow direction. This further development exploits the advantage that the cooling capacity is particularly high when the coolant flow is conducted essentially parallel to the surface of the flame deck and thus substantially in a radial alignment. It is thus the impingement flow and consequently the change of the substantially axial flow direction into a substantially radial flow direction of the coolant flow, which advantageously improves the cooling performance. This is achieved in that the supply passage for feeding the coolant flow along the receiving way—in particular a receiving way which includes and/or guides a receiving sleeve or receiving bushing or the like for a device or component extending into the cylinder, in particular for an injector or an ignition device—onto a flame deck of the cylinder head is designed in such a way that an impingement flow occurs on the flame deck.

Such an impingement flow causes high flow velocities close to the wall. These high flow velocities close to the wall increase heat transfer, which improves heat dissipation from the cylinder and in particular from the flame deck.

This advantageously reduces the requirements for the material from which the cylinder head is manufactured. For example, due to improved cooling of the cylinder head, combustion can be carried out in the cylinder with increased energy conversion, which leads to an increase in engine performance. Alternatively or in addition, a more cost-effective and/or lighter material can be used in the production of the cylinder head due to the lower maximum temperatures of the latter.

Optionally, it is further provided that the branch-off passage is fluidically connected to a cooling zone of the cylinder liner, in particular the top-liner region. Specifically, this may include that different cooling zones are formed within the top-liner region, each of which are supplied by way of a secondary partial flow. In this way—even within the top-liner region—a cooling need-based supply of various zones of the top-liner region can be carried out advantageously. In further developments, a ring-shaped arrangement of cooling zones—for example of four cooling zones—may be provided within the cylinder liner, wherein in particular a cooling zone located respectively further in the direction of the cylinder head has a higher cooling capacity than a cooling zone that is located further removed from the cylinder head. In this way, a locally accurate and needs-based distribution of the cooling capacity within the top-liner region can be performed.

Within the scope of a further development it is provided that the distribution system includes a number of distribution sections, whereby a distribution section is fluidically connected to a branch-off passage. In this way, a respective secondary partial flow can be branched off in a distribution section for a cooling zone assigned to this distribution zone.

Optionally, it is further provided that a distribution section has a cross-section that is smaller than the cross-section of a distribution section arranged upstream in flow direction of the coolant flow. In particular, a number of cylindrical distribution sections may be arranged axially adjacent to one another, concentrically on a distribution axis of the distribution system. A respective cooling zone is fluidically connected with the distribution section via the branch-off passage in a transverse, in particular perpendicular, orientation relative to the distribution axis. Due to the fact that the cross sections of the distribution sections decrease in flow direction, stepped shoulders are created. At such a stepped shoulder of a distribution section, the flow of the coolant flow is deflected from its movement along the distribution axis, in particular throttled and/or swirled. As a result, the geometric design influences the volume of fluid, so that the step acts as a resistance in the coolant flow. The part of the coolant flow deflected in a distribution section can thus flow advantageously as a secondary partial flow into the cooling zone assigned to this distribution section. The greater the cross-sectional difference between a particular distribution section and a distribution section downstream in the direction of flow, the greater the resistance and thus also the deflected secondary partial flow and, accordingly, the cooling capacity in the cooling zone assigned to this particular distribution section. The proportion of the coolant flow that is still present in the main channel at the end of the distribution system, i.e. the remaining primary partial flow, can finally be fed via a residual passage to a residual region of the cylinder liner for cooling. In this way, the cooling capacity for a cooling zone can be advantageously determined by designing the cross-sectional area of a distribution section. The step geometry described herein is advantageous to ensure a uniform supply of all cooling zones connected to the distribution system. With a geometry of the distribution system without such a step design, the coolant flow could for the most part flow past the branch-off passages due to its fluid dynamics and only be branched-off at the end of the distribution system or in the event of obstacles. This could lead to an uneven distribution of cooling power.

Optionally, it is further provided that the cross-section is round. A round cross-sectional area of a distribution section is to be produced with relatively little manufacturing effort, for example by drilling or milling, since only one process step is necessary in processing through the concentric cross sections along the drilling axis (pyramid-type bore).

Within the scope of a further development, it is provided that the distribution system is arranged in the direction of flow after the cylinder head. This includes in particular that the coolant flow is first directed in the cooling chamber of the cylinder head in the form of an impingement flow onto the flame deck and is subsequently divided by way of a distribution system into a primary partial flow and into at least one secondary partial flow for the purpose of cooling the cylinder liner. In such a serial arrangement of the cooling water flow the entire coolant flow can first be used to cool the cylinder head (and in particular the flame deck), and subsequently the (already heated) coolant flow for cooling the cylinder liner, wherein in the cooling of the cylinder liner by way of the distribution system a division, in particular between top-liner region and residual region, can still be carried out. Thus, a prioritization can be made in the (descending) order: cylinder head-top liner region-residual region.

Optionally, it is further provided that the distribution system or a branch-off is arranged before of the cylinder head, viewed in flow direction. This includes in particular that the coolant flow is divided in flow direction before the cylinder head, and a partial flow, in particular the secondary partial flow, is fed to the top-liner area of the cylinder liner. In contrast, another partial flow, in particular the primary partial flow, is first fed to the cylinder head—and in particular to the flame deck—and then to the remaining area of the cylinder liner. In such a parallel arrangement of the cooling water flow, cooling of the top-liner region thus receives a higher priority compared to the serial arrangement. This is especially the case because cooling is done with coolant that has not yet been used to cool the cylinder head. In addition, in a parallel arrangement the lower pressure losses continue to have a positive effect on the overall performance of the system.

In particular, it is provided that the supply passage, both in parallel and in serial arrangement, is arranged concentrically around the receiving way. A receiving way may in particular be designed as a receiving way which includes and/or guides a receiving sleeve or a receiving bushing or the like for a device or component which extends into the cylinder, in particular for an injector or an ignition device. This causes the coolant flow to flow around the receiving way, thus cooling its outer circumference uniformly.

In particular, it is further provided that the supply passage and the receiving way, in particular a receiving way which includes and/or guides a receiving sleeve or a receiving bushing or the like for a device or component which extends into the cylinder, together form a nozzle with an annular cross-section. Through such a nozzle, the coolant flow is shaped in particular into a free jet, which converts into an impingement flow upon impingement on the flame deck. Such a conversion leads in particular to a change in a substantially axial direction of movement of the coolant flow along the main axis in a substantially radial direction of movement of the coolant flow along the surface of the flame deck.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
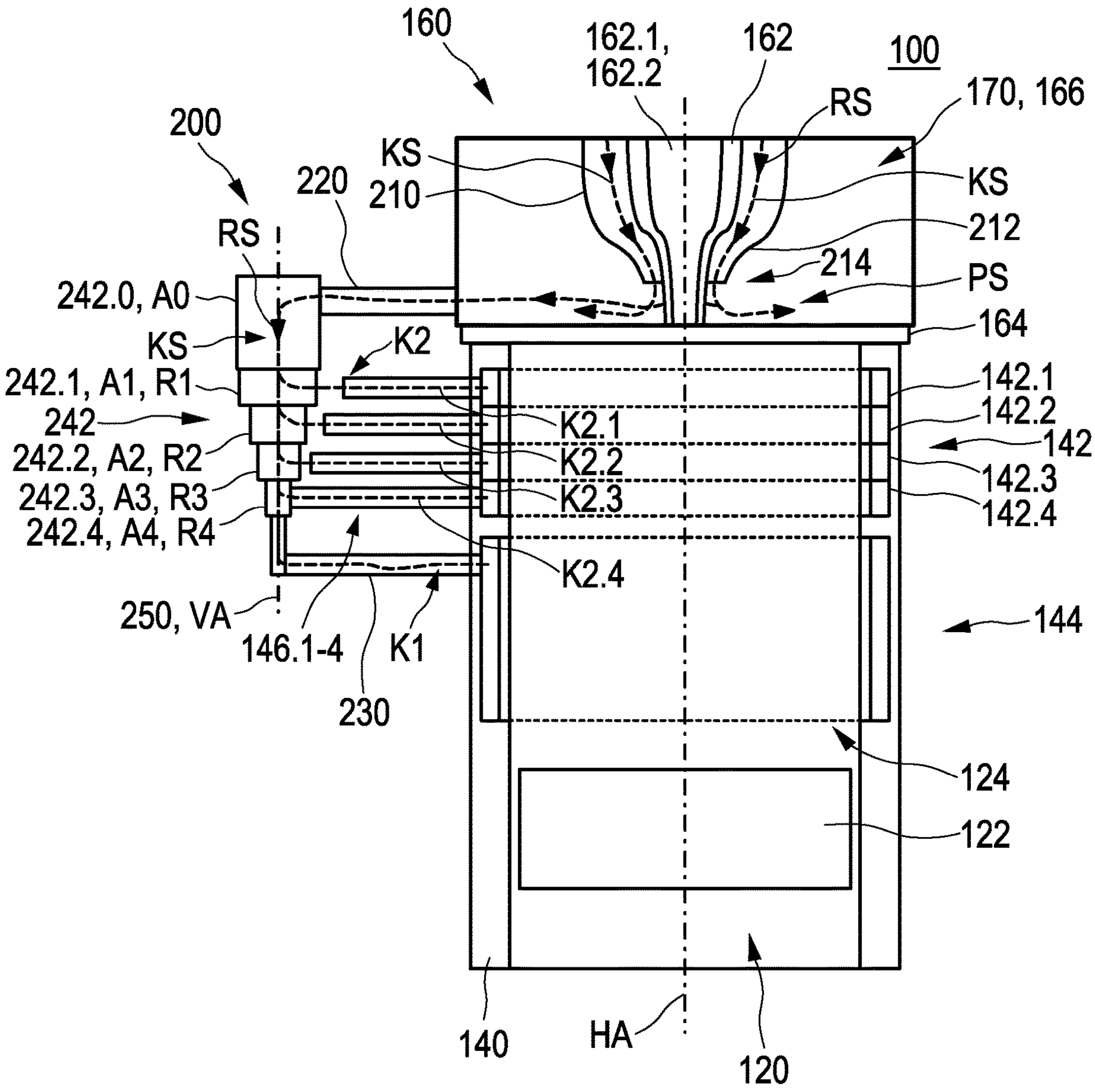
FIG. 1 is a cylinder of a crankcase according to the concept of the invention.

FIG. 1 shows a cylinder 100 according to the concept of the invention. Cylinder 100 has a cylinder interior 120, which is restricted in the radial direction by a cylinder liner 140 and in which a piston 122 which is shown herein in a simplified manner and, which can be moved in a translatory manner along a main axis HA and thus can be accommodated. Cylinder liner 140 can be used in a crankcase of an internal combustion engine 1000 not shown here. In order to generate a drive movement, piston 122 is moved up and down by a combustion carried out within cylinder interior 120. A cylinder head 160 closes cylinder 100 on an upper side, in other words on a side of cylinder 100 opposite a crankshaft of the internal combustion engine. At the transition to cylinder interior 120, cylinder head 160 has a flame deck 164, which represents the boundary surface to a combustion chamber 124, in which combustion takes place within cylinder interior 120. Flame deck 164 thus forms the frontal boundary of combustion chamber 124 opposite piston 122. Cylinder head 160 has a receiving way 162, in particular a receiving way which includes and/or guides a receiving sleeve or a receiving bushing or the like for a device or component which extends into the cylinder or component, in particular for an injector or an ignition device for an injector or an ignition device 162. By way of an injector 162.1, fuel can be fed into combustion chamber 124, in particular in embodiments used in a diesel engine.

By way of an ignition device 162.2, which may be designed in particular as a spark plug, a mixture located in cylinder interior 120 can be ignited. This is the case especially in embodiments used in gas or gasoline engines.

Receiving way 162 may be designed to accommodate an injector 162.1 or an ignition device 162.2, or may already be designed as a one-piece component incorporating integrated injector 162.1 or integrated ignition device 162.2; therefore, receiving way 162 does not necessarily need to be in the embodiment of a separate part, but receiving way 162 may simply be designed as a receptacle in a work piece or device. Furthermore, cylinder head 160 has a cooling system 170 with a cooling chamber 166, essentially in the embodiment of an interior cavity. In the present example, receiving way 162, in particular a way which includes and/or guides a receiving sleeve or receiving bushing or the like for a device or component extending into the cylinder, in particular for an injector or an ignition device is arranged in a rotationally symmetric manner around main axis HA.

Furthermore, cylinder head 160 has a supply passage 210 arranged concentrically around receiving way 162. Supply passage 210 has an approximately annular cross section which is variable in sections and changes in its radius, in particular changes in the axial direction and serves the supply of a coolant flow KS. Due to the annular cross-section around receiving way 162 and in particular due to a taper 212, supply passage 210 and receiving wayl 62—which in the current example is in the embodiment of a sleeve or bushing—form a nozzle 214, which turns coolant flow KS into an impingement flow PS, which impinges onto flame deck 164 inside cooling chamber 166. Impingement flow PS ensures that coolant flow KS spreads along flame deck 164 at relatively high speed, close to a wall in the form of a radially spreading flow. This leads to relatively high heat transfer. This means that the heat in combustion chamber 124 resulting from a combustion in cylinder 100 which is being transferred via flame deck 164 into cooling chamber 166 is effectively absorbed and dissipated by coolant flow KS. Coolant flow KS, which spreads in the form of impingement flow PS over flame deck 164, is then discharged from cooling chamber 166 via a discharge passage 220 and fed into a distribution system 240.

Distribution system 240 separates coolant flow KS, which has already absorbed a first amount of heat in cylinder head 160, into a primary partial flow K1 and into at least one secondary partial flow K2. In the present case, four secondary partial flows K2.1, K2.2, K2.3, K2.4 are branched off, each of which is fed to a cooling zone 142.1, 142.2, 142.3, 142.4 of a top-liner region 142 of cylinder liner 140 for cooling. Remaining primary partial flow K1, that is the non-branched part of coolant flow KS, is fed to a remaining region 144, in this example below top liner region 142.

"Below" in this context means being positioned further away from the cylinder head in the direction of the crankshaft. Top liner region 142 is the zone of cylinder interior 120 where, as expected, the highest temperatures occur due to combustion. Therefore, according to the concept of the invention, at least one separate cooling circuit is provided for this region, which is supplied by at least one secondary partial flow K2.1, K2.2, K2.3, K2.4. The remaining region 144 is accordingly a zone of cylinder interior 120, in which—compared to the top liner region—lower temperatures occur. Therefore, this area can be cooled in particular with a lower specific cooling capacity. It is also possible, for example, to cool remaining region 144 with the same absolute cooling capacity as top-liner region 142, but to design remaining region 144 larger, so that the specific cooling capacity in remaining region 144 is lower.

In the present example, top liner region 142 is again separated into four cooling zones 142.1, 142.2, 142.3, 142.4. From the perspective of main axis HA, these are arranged axially adjacent to one another within top liner region 142. Each cooling zone 142.1, 142.2, 142.3 142.4 is designed as an annular cooling channel which surrounds cylinder interior 120 tangentially surrounding within cylinder liner 140, wherein the cooling channels do not have to be designed as individually arranged and separate channels but can also be different zones of a cooling chamber which may be partially or completely fluidically connected with one another. Each cooling zone 142.1, 142.2, 142.3, 142.4 is supplied via the respective secondary partial flow K2.1, K2.2, K2.3, K2.4. By dividing top-liner region 142 into individual cooling zones, an even more precise local influence on the cooling capacity can be advantageously achieved. In particular, in a zone of combustion chamber 124, where higher temperature development is to be expected, a correspondingly higher cooling capacity can be achieved.

For branching off secondary partial flows K2.1 to K2.4, distribution system 240 has a main channel 250, which in turn has a base section 242.0 with a circular cross-sectional region A0 and four distribution sections 242.1, 242.2, 242.3, 242.4, which are axially spaced along a distribution axis VA and are distinctly cylindrical. Each distribution section 242.1, 242.2, 242.3, 242.4 respectively has a cavity with a circular cross-sectional area A1, A2, A3, A4 with a radius R1, R2, R3, R4, which is smaller than the cross-sectional area A0, A1, A2, A3 of a basic or distribution section 242.0, 242.1, 242.2, 242.3, viewed in flow direction RS of primary partial flow K1.

From each distribution section a branch passage 146.1, 146.2, 146.3, 146.4 respectively branches off transversely to distribution axis VA, and in particular perpendicular to distribution axis VA, which fluidically connects respective distribution section 242.1, 242.2, 242.3, 242.4 with corresponding cooling zone 142.1, 142.2, 142.3, 142.4. For example, first branch-off passage 146.1 connects first distribution section 242.1 with first cooling zone 142.1.

Due to the axially adjacent arrangement of the cylindrically formed distributor sections 242.1, 242.2, 242.3, 242.4, annular step shoulders S1, S2, S3, S4 (see FIG. 3) are formed because of the radii which decrease in the direction of flow, on each of which the coolant flow KS moving along the distributor axis VA is partially throttled and/or swirled. This ensures that coolant flow KS does not flow past a respective branch passage 146.1, 146.2, 146.3, 146.4, but is specifically throttled and thus supplied as a secondary partial flow K2.1, K2.2, K2.3, K2.4 in particular to the respective branch passage 146.1, 146.2, 146.3, 146.4. In this way, a uniform distribution of the cooling capacity to different cooling zones 142.1, 142.2, 142.3, 142.4 is achieved advantageously with relatively low design expenditure. Alternatively, in addition to an even distribution—via a corresponding design of cross-sectional areas A1, A2, A3, A4—a targeted uneven distribution is also possible, whereby in a certain cooling zone or a certain number of cooling zones 142.1, 142.2, 142.3, 142.4 a larger or smaller cooling volume is supplied than is the case in a different cooling zone or number of cooling zones 142.1, 142.2, 142.3, 142.4. A residual passage 230 is connected to fourth distribution section 242.4, which fluidically connects distribution system 240 with residual area 144, which is annular and tangentially surrounds an axial section of cylinder interior 120. Via residual passage 230, residual primary partial flow K1 can be supplied to residual region 144 for cooling. In general, in the context of the invention, several regions can also be distinguished as the top-liner region 142 and the residual region 144 by considering further areas, each of which has at least one cooling zone.

Figure 2A:
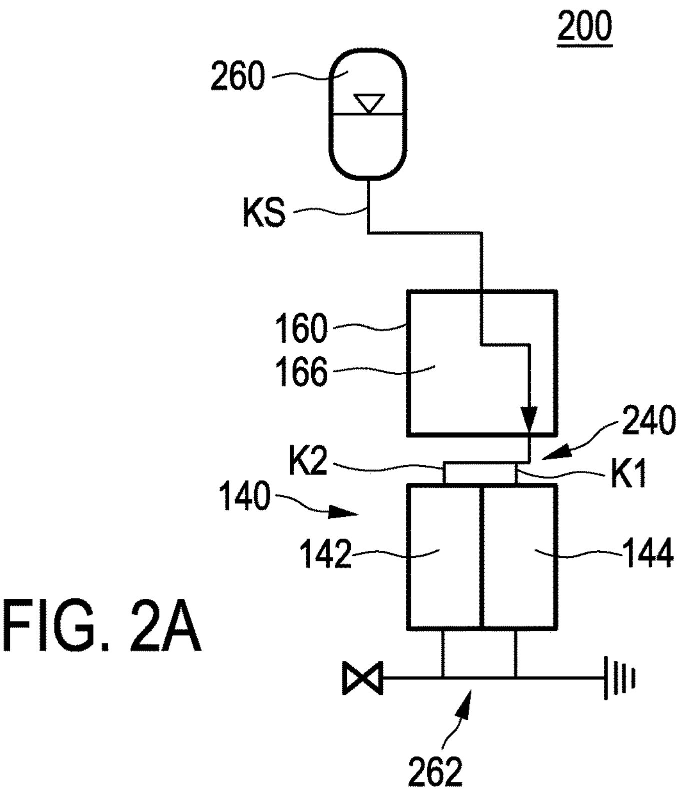
FIGS. 2A are B are, respectively, arrangements of a cylinder, cooling system and distributing system.
Figure 2B:
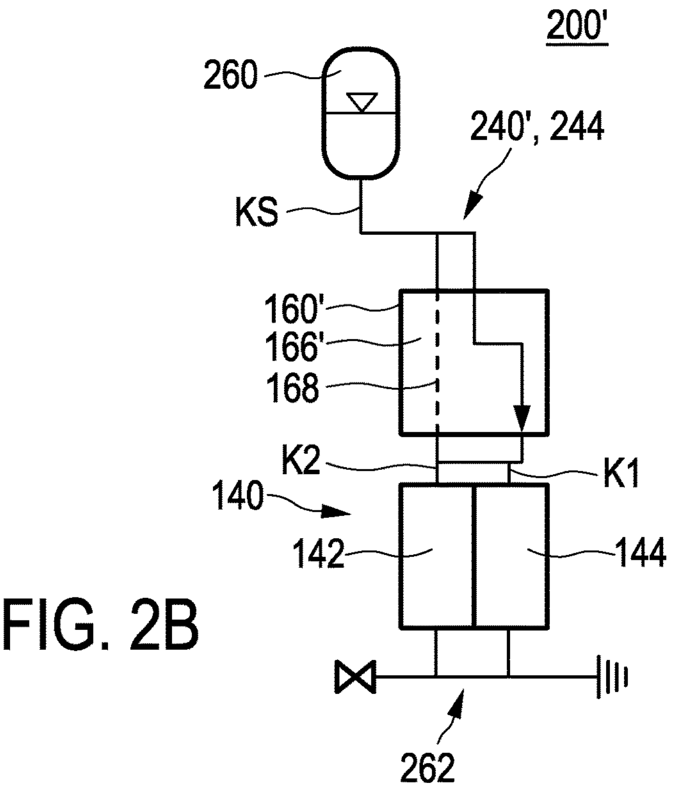

FIGS. 2A and 2B each show a possible arrangement of the cooling water flow, designated as cooling devices 200, 200'. FIG. 2A shows a serial arrangement, FIG. 2B shows a parallel arrangement of the cooling water flow. Cooling device 200 shown in FIG. 2A corresponds substantially to the further development shown in FIG. 1. Here, a coolant source 260 provides a coolant, in particular cooling water, which is guided in the form of a coolant flow KS into cooling chamber 166 of a cylinder head 160. There, coolant flow KS first cools—as shown in FIG. 1 and not shown in more detail here—via an impingement flow PS onto flame deck 164 of cylinder head 160. Subsequently, coolant flow KS is supplied to a distribution system 240, where it is divided into a primary partial flow K1 and at least one secondary partial flow K2. These partial flows K1, K2 are each used to supply an area of a cylinder liner 140 for cooling purposes. The at least one secondary partial flow K2 is supplied to a top liner region 142, and the primary partial flow K1 to a residual region 144. Subsequently, partial flows K1, K2 are supplied to a coolant sink 262.

The arrangement of a cooling device 200' shown in FIG. 2B differs substantially from the further development shown in FIG. 2A in that a distribution system 240' is arranged between the pressure medium source 260 and a cylinder head 160'. Alternatively, instead of distribution system 240', a branch 244, for example formed as a T-piece or similar branch, can also be used. Thus, coolant flow KS is already divided into two partial flows K1, K2 before it is supplied to cylinder head 160'. One partial flow K1, K2, in particular the branched-off secondary partial flow K2, is thereby guided past cooling chamber 166' of cylinder head 160' via a cylinder head bypass 168 without removing heat from the latter, in other words, practically without developing any cooling capacity. In contrast, primary partial flow K1 is guided for cooling purposes into cooling chamber 166', analogously to the further development shown in FIG. 2A, where it impinges onto flame deck 164 in particular by way of an impingement flow PS which is not shown here. Secondary partial flow K2, which is directed via cylinder head bypass 168 and is therefore practically not yet used for cooling, is fed to top liner region 142 of cylinder liner 140 downstream of cylinder head bypass 168. Here, in accordance with the concept secondary partial flow K2 can optionally be further divided by way of a further distribution system not shown here, in order to supply different cooling zones within top liner region 142, analogously to the further development shown in FIG. 1. Primary partial flow K1 which is already used for cooling cylinder head 160', is on the other hand supplied to residual region 144 for cooling the same. Both partial flows K1, K2 are supplied to a coolant sink 262 downstream of respective regions 142, 144 of cylinder liner 140.

Figure 3:
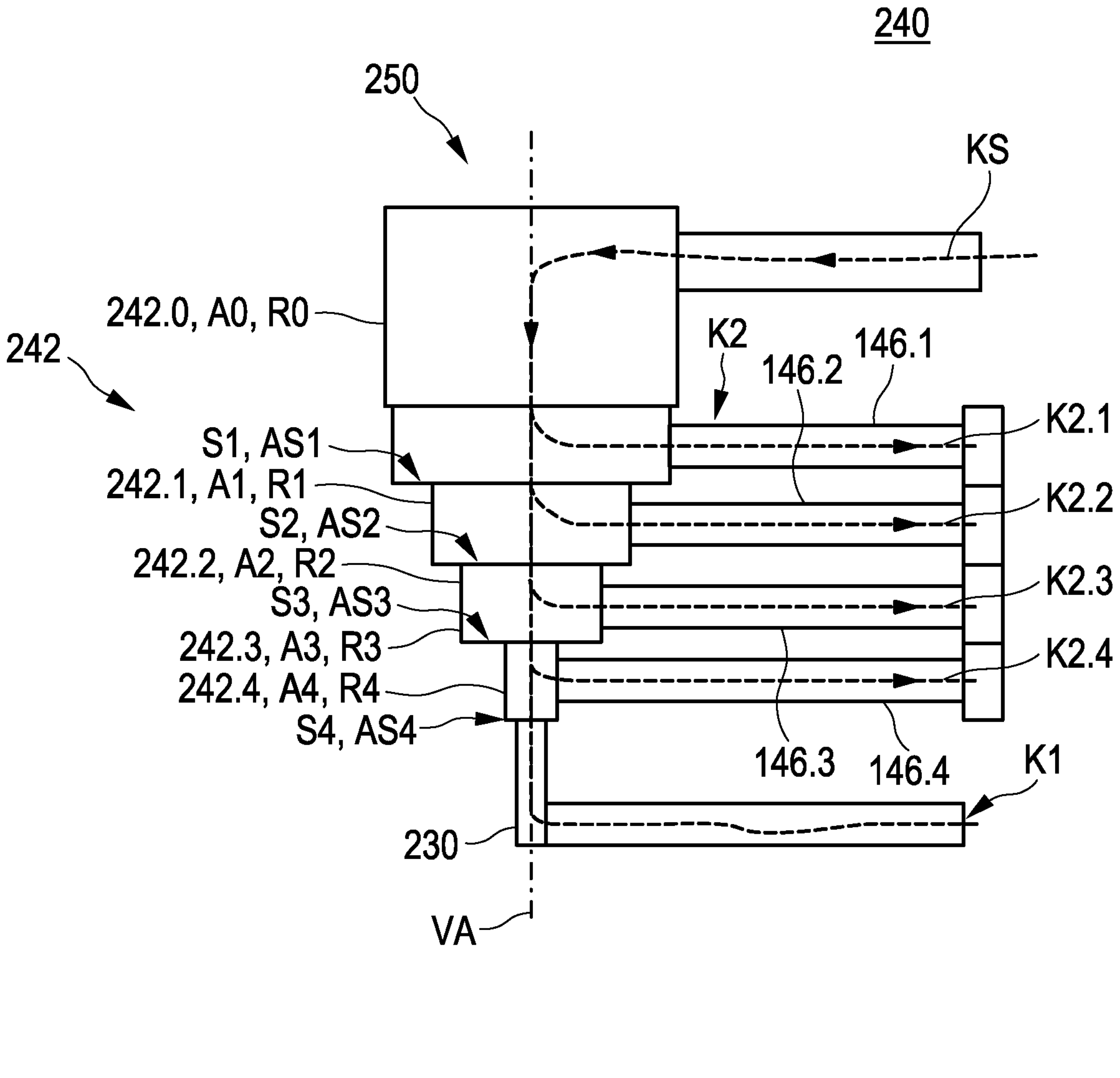
FIG. 3 is a detailed view of a distributing system.

FIG. 3 shows a detail of the distribution system 240. In particular, visible here are annular step shoulders S1, S2, S3, S4, which are respectively formed at the transitions between distribution sections 242.1, 242.2, 242.3, 242.4 of sub-distributor 242, as well as at the transition of distribution section 242.4 to residual passage 230. For example, first step shoulder S1 is formed at the transition between first distribution section 242.1 and second distribution section 242.2. Analogously, at the transition between the second distribution section 242.2 and third distribution section 242.3, second step shoulder S2 is formed, and at the transition between third distribution section 242.3 and fourth distribution section 242.4, third step shoulder S3 is formed. At the transition of distribution section 242.4 to residual passage 230 fourth step shoulder S4 is formed.

Coolant flow KS conducted through distribution system 240 is deflected at step shoulders S1, S2, S3, S4 and supplied to a respective branch passage 146.1, 146.2, 146.3, 146.4 for the purpose of supplying a cooling zone 142.1, 142.2, 142.3, 142.4. The mass flow of secondary partial flow K2.1, K2.2, K2.3, K2.4 branched off at this step shoulder S1, S2, S3, S4 can be influenced by designing the size of an annular step area AS1, AS2, AS3, AS4 of a step shoulder S1, S2, S3, S4. If, for example, step area AS2 of second stage shoulder S2 is selected to be larger, a correspondingly larger proportion of coolant flow KS is deflected at this second step shoulder S2, and supplied as a second secondary partial flow K2.2 to second branch passage 146.2 in order to supply second cooling zone 142.2 with coolant.

Figure 4:
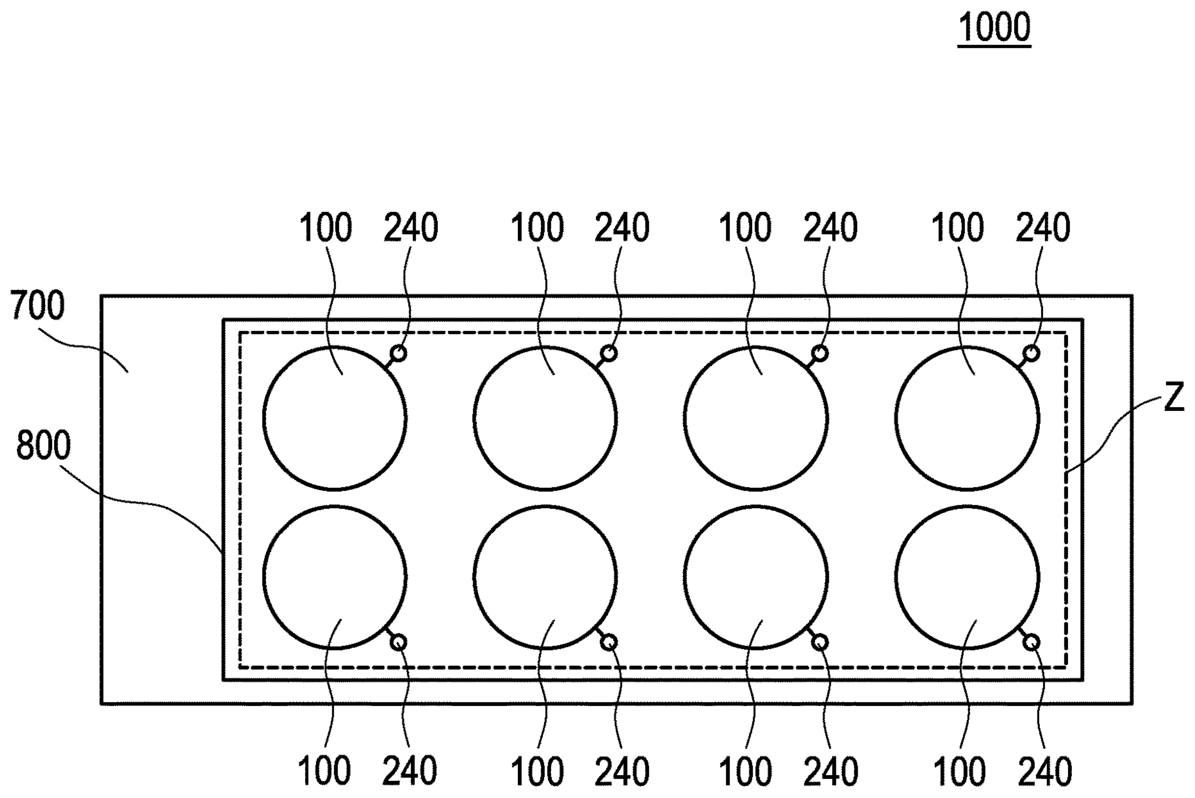
FIG. 4 is an internal combustion engine with a crankcase according to the concept of the invention.

FIG. 4 shows an internal combustion engine 1000 with an engine 700. Engine 700 has a crankcase 800, which in turn has a number Z of eight cylinders 100—shown here in highly simplified form. Each cylinder 100 has a distribution system 240 which, in accordance with the concept of the present invention, divides a coolant flow not shown here into a primary cooling flow and at least one secondary cooling flow.

COMPONENT IDENTIFICATION LISTING

100 cylinder
120 cylinder interior
122 piston
140 cylinder liner
142 top liner region of cylinder liner
142.1-142.4 cooling zone of top liner region
144 residual region of cylinder liner
146, 146.1-146.4 first to fourth branch-off passage
160, 160' cylinder head
162 receiving way, in particular receiving way which includes and/or guides a receiving sleeve or a receiving bushing or the like for a device or component which reaches into the cylinder, in particular an injector or an ignition device.
162.1 injector
162.2 ignition device
164 flame deck
166, 166' cooling chamber
168 cylinder head bypass
170 cooling system
200, 200' cooling device
210 feed passage
212 taper
214 nozzle
220 discharge passage
230 residual passage
240, 240' distribution system
242.0 base section
242.1-242.4 distribution section
250 main channel
260 coolant source
262 coolant sink
700 engine
800 crankcase
1000 internal combustion engine
A, A1-A4 cross section, first to fourth cross section
AS, AS1-AS4 step area, first to fourth step surface
HA main axis
K1 primary partial flow
K2 secondary partial flow
K2.1-K2.4 first to fourth secondary partial flow
KS coolant flow
PS impingement flow
RS flow direction of coolant flow
S, S1-S4 step shoulder, first to fourth step shoulder
VA distribution axis
Z number of cylinders While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A crankcase, comprising:
at least one cylinder for an internal combustion engine, the cylinder including:
a cylinder interior;
a cylinder liner which is arranged within the cylinder interior;
a cylinder head which closes the cylinder interior, wherein the cylinder head includes a receiving way;
a cooling system which guides a coolant flow and has a cooling chamber;

a distribution system to separate the coolant flow into a primary partial flow and at least one secondary partial flow, the distribution system including a main channel for the primary partial flow and at least one branch-off passage for the at least one secondary partial flow, the at least one branch-off passage branching off from the main channel and being arranged transversely to the main channel for the at least one secondary partial flow, wherein the distribution system includes a plurality of distribution sections and the at least one branch-off passage includes a plurality of the at least one branch-off passage, wherein a respective one of the plurality of distribution sections is fluidically connected with a respective one of the plurality of the at least one branch-off passage, the plurality of the at least one branch-off passage being arranged transversely to a longitudinal axis of the cylinder, the main channel being positioned entirely external to the cylinder head.

2. The crankcase of claim 1, wherein the receiving way at least one of includes and guides one of a receiving sleeve and a receiving bushing for one of a device and a component which extends into the cylinder, wherein one of the device and the component is one of an injector and an ignition device.

3. The crankcase according to claim 1, wherein the cylinder liner includes a top-liner region and a residual region, the distribution system is configured for supplying the at least one secondary partial flow to the top-liner region that is located closer to the cylinder head and is configured for supplying the primary partial flow to the residual region located further removed from the cylinder head.

4. The crankcase according to claim 1, wherein the cylinder head includes a flame deck, the cooling system includes a supply passage configured for feeding the coolant flow along the receiving way onto the flame deck of the cylinder head in such a way that an impingement flow occurs on the flame deck.

5. The crankcase according to claim 1, wherein the cylinder liner includes at least one cooling zone, the at least one branch-off passage being fluidically connected with the at least one cooling zone of the cylinder liner.

6. The crankcase according to claim 1, wherein the plurality of distribution sections includes a first distribution section and a second distribution section, the first distribution section having a first cross-section that is smaller than a second cross-section of the second distribution section arranged upstream in a flow direction of the coolant flow.

7. The crankcase according to claim 6, wherein the first cross-section and the second cross-section are each round.

8. The crankcase according to claim 1, wherein the distribution system is arranged in a flow direction after the cylinder head.

9. The crankcase according to claim 1, wherein one of the distribution system and a branch of the crankcase is arranged in a flow direction before of the cylinder head.

10. The crankcase according to claim 1, further including a supply passage which is arranged concentrically around the receiving way.

11. The crankcase according to claim 1, further including a supply passage, the supply passage and the receiving way for one of an injector and an ignition device together form a nozzle having an annular cross-section.

12. An internal combustion engine system, comprising:

an internal combustion engine including a crankcase, which includes:

at least one cylinder for the internal combustion engine, the cylinder including:

a cylinder interior;

a cylinder liner which is arranged within the cylinder interior;

a cylinder head which closes the cylinder interior, wherein the cylinder head includes a receiving way;

a cooling system which guides a coolant flow and has a cooling chamber;

a distribution system to separate the coolant flow into a primary partial flow and at least one secondary partial flow, the distribution system including a main channel for the primary partial flow and at least one branch-off passage for the at least one secondary partial flow, the at least one branch-off passage branching off from the main channel and being arranged transversely to the main channel for the at least one secondary partial flow, wherein the distribution system includes a plurality of distribution sections and the at least one branch-off passage includes a plurality of the at least one branch-off passage, wherein a respective one of the plurality of distribution sections is fluidically connected with a respective one of the plurality of the at least one branch-off passage, the plurality of the at least one branch-off passage being arranged transversely to a longitudinal axis of the cylinder, the main channel being positioned entirely external to the cylinder head.

* * * * *